(No Model.)
F. BAIN.
METHOD OF FORMING COAL CUTTERS.
No. 501,755. Patented July 18, 1893.
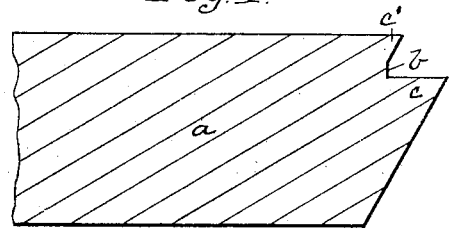
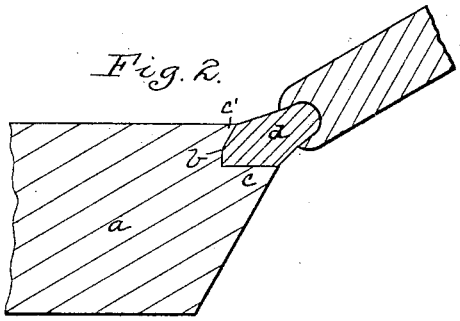
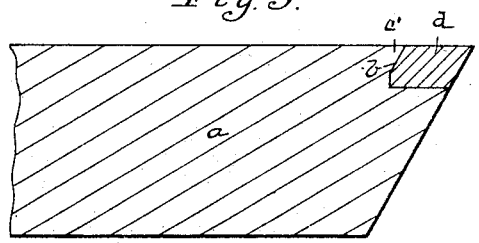
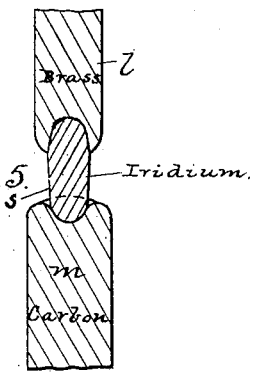
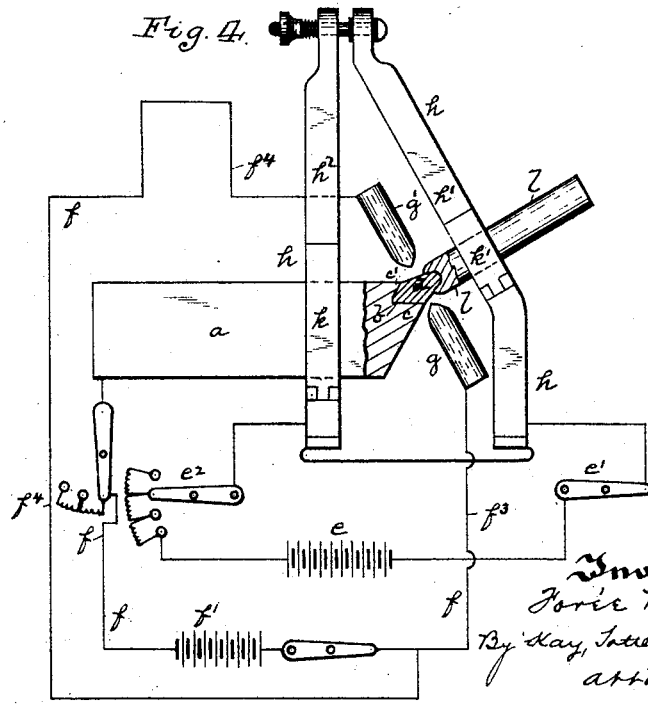
Witnesses:
D. L. Dorsey
L. D. Dams
Inventor,
Foric Bain.
By Kay, Totten & Cooke,
attorneys.

ns of this iridium point which is to be # UNITED STATES PATENT OFFICE.

FORÉE BAIN, OF CHICAGO, ILLINOIS, ASSIGNOR TO SAMUEL S. BROWN, OF PITTSBURG, PENNSYLVANIA.

METHOD OF FORMING COAL-CUTTERS.

SPECIFICATION forming part of Letters Patent No. 501,755, dated July 18, 1893.

Application filed May 31, 1892. Serial No. 435,028. (No model.)

*To all whom it may concern:*

Be it known that I, FORÉE BAIN, a resident of Chicago, in the county of Cook and State of Illinois, have invented a new and useful Improvement in Coal-Cutters and Methods of Forming the Same; and I do hereby declare the following to be a full, clear, and exact description thereof.

My invention relates to the making of cutters for mining and other coal and stone cutting machines, its object being to provide the cutters with such hard cutting points as will withstand wear, and will not require frequent sharpening, as well as to provide a cutting point that will not readily oxidize. It is known that iridium is one of the most hard and refractory metals, but there is great difficulty in the employment of the same for cutting purposes as it is very brittle, and is therefore liable to crack off under sudden blows or strains, while at the same time it is extremely expensive and hard to work, so that cutters formed of such metal would not be durable and would be entirely too costly.

By the present invention I provide a cutter in which the advantages of hardness of this metal are utilized, and as is necessary for the purpose I employ a suitable support for the point of the machine, such as a body of iron or steel, and the iridium is firmly welded to the support or backing, as other means of uniting would not withstand the strain to which such tools are subjected.

My invention therefore consists in forming such a tool by shaping the body of the tool from iron, steel or like metal with a recess at the point end thereof, and then uniting the iridium point thereto by including the iridium and the tool body within an electric circuit and bringing the iridium to a sufficiently high heat and pressing the iridium while hot and mastic into the recess so formed in the body of the tool. It also consists in uniting the iridium point to a suitable metal holder, such as by uniting the same thereto by the medium of an electric current, and subsequently uniting the iridium point, when so supported, to the body of the tool, and then separating the iridium point from the holder.

It also consists in other improvements as hereinafter set forth.

To enable others skilled in the art to practice my invention, I will describe the same more fully, referring to the accompanying drawings in which—

Figure 1 is a view of the cutter body ready to receive the iridium point. Fig. 2 shows the iridium point welded to the cutter body. Fig. 3 shows the finished cutter having the finished iridium point welded thereto. Fig. 4 shows an electric welding apparatus illustrating the manner of welding the iridium point to the body of the cutter; and Fig. 5 shows the terminals in welding the iridium to the brass or other holder to which it is first united.

Like letters of reference indicate like parts in each.

The body of the cutter is formed of iron, steel or like metal suitable for the purpose, the body *a* having a dove-tailed recess or seat *b* formed at the cutting end thereof to receive the iridium point, the cutter extending up beyond the seat as at *c* so as to form a backing to the iridium point, extending as far back as practicable of the same to support it against jars and strains when the cutter is in use. It has also the projecting lip *c'* at the other end to extend over the body of the point and give support to the iridium point *d*, the shape of the seat for the iridium point being changed according to the tool with which it is to be united so as to give the most practicable and firmest support to the iridium point.

So far as known to me, the only practicable means of uniting the point to the body of the cutter is by electric welding, on account of the high refractory character and melting point of the iridium, and the difficulties of maintaining the necessary heat except through such method. Any suitable form of electric welding apparatus may be employed for the purpose, that shown in the drawings being well adapted to unite the body and the point of the cutter. For practical purposes I prefer to employ a direct current such as obtained from a storage battery or dynamo, such as shown at *e*, the alternating current system not being as advantageous for the reason that it is desirable to generate the greatest heat at the edge of the iridium point which is to be united to the steel body or to the holder prior to uniting the point to the body. Such battery or generator $e$ is connected in circuit with the holder $h$ having two arms $h'$ $h^2$, said arms of the holder being insulated from each other, and the arms having the clamps $k$ $k'$ to hold the parts in forming the weld. A suitable cut-off, as at $e'$, and current regulator, as at $e^2$, may, of course, be employed in the circuit. At the same time, in order to generate as high a heat as possible in the body of iridium, I may employ the auxiliary electric circuit $f$, the generator being illustrated at $f'$, and the negative wire $f^2$ extending to the cutter body or to the negative arm $h^2$ of the holder, while the positive wire is divided as at $f^3$ $f^4$ and carried to the two carbon points $g$ $g'$, so as to generate a still further current from said carbon terminals into the iridium, and thence by the negative wire $f^2$ to the battery. By such double means sufficient heating of the iridium point to raise it to a welding state so that it will readily weld with the body of the cutter is insured, though, for some purposes, the single current will be all that is necessary. Of course, suitable shut-offs and current regulators may be employed in the auxiliary circuit.

The first step in forming the cutter is to unite the iridium point to a suitable holder or supporting stick, this being necessary to provide only one contact in welding the point to the cutter body, as if it were attempted to weld it directly to the cutter body it would weld at both contacts and part of the heat generated by the current would be lost in the second contact. For this purpose I secure in one arm, such as the arm $h^2$, of the apparatus shown, a stick of brass or other suitable metal, as at $l$, preferring soft metal, such as may most easily be separated from the point after it is secured to the cutter. In the other arm $h^2$ I secure a suitable carbon electrode $m$, and I then place the piece of iridium $s$, which is to form the point $b$, between the brass or like stick $l$ and the carbon electrode $m$, as shown in Fig. 5. By the employment of the current in the way above described, it is carried through the body of iridium which is welded to the brass stick the result of which is that the iridium point is firmly secured to the said stick or holder. When this is done, either by the same or similar apparatus, the body $a$ of the cutter is secured in one arm $h'$ of the holder of the electric welding apparatus, so that a large portion of that body is within the electric circuit, that part being secured to the negative electrode, and the brass stick carrying the iridium point is secured in the other part of the holder which is the positive electrode, and by means of the single current or regenerator $e$, or by it with the auxiliary current through the circuit $f$ the parts are raised to a high welding heat, the iridium piece $s$ being raised to a much higher heat than the steel body, as a smaller portion thereof and its holder is within the circuit than the body of the cutter $a$, and the iridium forming the positive electrode which adds materially to its heat, so that while the seat $b$ in the cutter body is raised to the necessary welding heat, the body of the iridium point in contact therewith is raised to a much higher heat, and it is brought to such softness or state of fusion that it may be easily forced into the seat in the cutter body, and caused to conform in shape to the seat and be firmly welded to the body of the cutter. In this way a perfect weld or union between the body of the cutter and the iridium point is obtained, and all that is necessary to complete the tool is to separate the brass stick or holder $l$ from the iridium point $b$ and then to dress the point to the proper shape for the cutter, by any suitable means, such as by the lapidary wheel, in this way completing the tool. I am thus enabled to produce a cutting tool which has an extremely hard cutting point or edge, and one which will hold such edge without the necessity of frequent dressing or sharpening, and at the same time to obtain a perfect union between such extremely hard point and the supporting body therefor, so that the metal forming the point may be properly supported as against strains and jars, and the peculiar qualities of such metal be utilized for cutting and drilling, or like purposes, at practically small cost.

What I claim as my invention, and desire to secure by Letters Patent, is—

1. The herein-described method of forming coal and other cutting tools, consisting in shaping the body of the tool from iron, steel or like metal with a recess at the point end thereof, and then uniting a piece of iridium to form the point to the body portion of the tool by including the parts within an electric circuit and pressing the iridium while hot and plastic into the recess so formed in the body of the tool, and so uniting the iridium point to the body, substantially as set forth.

2. The herein-described method of forming coal and other cutting tools, consisting in first uniting a piece of iridium to form the point to a suitable metal holder through the medium of an electric circuit, and then uniting the iridium point to the body of the cutting tool through the medium of an electric current, and subsequently separating the metal holder from the iridium point, substantially as and for the purposes set forth.

3. The herein-described method of forming coal and other cutting tools, consisting in shaping the body of the tool from iron, steel or like metal with a recess at the point end thereof, and then including a piece of iridium to form the point and a large part of the tool body within an electric circuit and thereby raising the iridium by heat to the necessary plastic state and pressing it into the recess in the tool body, substantially as set forth.

4. The herein-described method of forming coal and other cutting tools, consisting in shaping the tool body from iron, steel or like metal with a recess at the point thereof, then including such body and a piece of iridium to form a point within an electric circuit, and at the same time including a piece of iridium in an auxiliary or supplementary electric circuit and so increasing the heat of the iridium until sufficiently plastic to be pressed into the recess in the tool body, substantially as set forth.

In testimony whereof I, the said FORÉE BAIN, have hereunto set my hand.

FORÉE BAIN.

Witnesses:
M. F. ALLEN,
L. E. JONES.